Sept. 16, 1969 D. K. HANINK 3,466,737
BRAZING OF TITANIUM
Filed May 18, 1966 3 Sheets-Sheet 1

INVENTOR
Dean K. Hanink
BY
Peter P. Kozak
ATTORNEY

INVENTOR.
Dean K. Hanink
BY
Peter P. Kozak
ATTORNEY

3,466,737
BRAZING OF TITANIUM
Dean K. Hanink, Indianapolis, Ind., assignor to General Motors Corporation, Detroit, Mich., a corporation of Delaware
Filed May 18, 1966, Ser. No. 550,994
Int. Cl. B23k 1/04, 31/02
U.S. Cl. 29—492     5 Claims

ABSTRACT OF THE DISCLOSURE

A method is disclosed for the silver brazing of titanium workpieces to avoid the formation of the brittle silver-titanium intermetallic compound. In a preferred embodiment a thin film of chromium is vapor deposited on titanium surfaces to be brazed. Silver brazing is then accomplished by conventional methods, the chromium layer permitting the interdiffusion of silver and titanium but preventing the formation of a brittle intermetallic compound.

---

The invention herein described was made in the course of work under a contract or subcontract thereunder with the Department of Defense.

This invention relates to the fabrication of titanium and titanium alloy components or sections into useful articles of manufacture. More particularly, it relates to an improved brazed joint between titanium components and to an improved method of brazing such components. As used herein titanium refers to both titanium and titanium alloy components.

In the prior art titanium components have been brazed using suitable silver alloy brazing materials. However, it is known that molten silver will react with titanium to form a brittle intermetallic compound which weakens the joint and impairs its fatigue resistance. This has meant in general that a brazing cycle could not be used in which the silver alloy remained in the molten state for more than about fifteen minutes, if the brazed joint was designed to withstand relatively severe stresses or to be subjected to cyclic loads. For this reason engineers have not been able to take advantage of the generally superior mechanical and chemical properties of titanium in many engineering applications. When massive titanium based components were silver brazed, the heat content of the components was such that the silver remained in the molten state for a period sufficient for the formation of the brittle silver-titanium compounds at the interface of the braze and the titanium member. Therefore, the prior state of the art has been lacking in the ability to silver braze titanium by using conventional brazing heating cycles to achieve mechanical properties which take full advantage of titanium's high strength-to-weight ratio necessary in efficient, relatively light weight, large structures.

It is an object of this invention to provide a strong, ductile, fatigue-resistant silver alloy brazed joint between titanium sections in an article of manufacture.

It is a more specific object of this invention to provide a strong silver alloy brazed bond between large titanium sections when a brazing cycle is required in which molten silver is in contact with a titanium or titanium alloy member for substantially longer than about fifteen minutes.

It is a further object of this invention to provide a silver brazed titanium joint wherein the critical portion of the joint, the interfacial layer between a titanium section and the silver alloy braze, contains chromium. This interfacial portion of a joint is thus comprised of a ductile alloy comprised of chromium, silver, and titanium; no brittle intermetallic compound being formed.

It is another object of this invention to provide an improved method of brazing titanium or titanium alloy sections with a silver brazing alloy in which in the preferred embodiment chromium is first applied to the mating titanium surfaces to prevent the formation of brittle intermetallic compounds of titanium and silver.

In accordance with my invention, these and other objects are accomplished in a preferred embodiment by applying, as for example by depositing, plating or the like, a thin film or layer of chromium to each of the titanium surfaces which are to come in contact with the molten silver brazing alloy. Preferably the titanium surfaces are clean so as not to interfere with the chromium deposition or the flow of the silver alloy during the subsequent brazing step. Sufficient chromium is applied to alloy with the titanium and silver during the braze cycle. In general, a chromium layer about 0.00005" to 0.001" in thickness is preferred. When a chromium film of suitable thickness has been applied, the parts are then brazed by techniques well known in the art. The metallurgical bond is thus comprised of the ductile alloy comprised of silver, chromium, and titanium and no brittle intermetallic compound is formed.

Other objects of my invention will become apparent to those skilled in the art in view of the following detailed description thereof, reference being made to the enclosed figures in which:

FIGURE 1 is a photomicrograph at 500× showing a brazed joint between titanium and silver brazing alloy, chromium having been plated on the titanium prior to brazing in accordance with my invention;

FIGURE 2 consists of two photomicrographs, at 2500× and 10,000× respectively, of the interface between titanium and silver brazing alloy, chromium having been plated on the titanium prior to brazing;

FIGURE 3 includes two photomicrographs similar to FIGURE 2 of a silver brazed titanium point in which no chromium was used in accordance with prior art techniques;

I have discovered that chromium may be advantageously applied to titanium surfaces in extremely thin films to effectively prevent the formation of the brittle intermetallic compound during silver brazing cycles of practical duration. Some prior art techniques have attempted to inhibit the silver-titanium reaction by providing a metallic barrer layer over the titanium sections. However, these barriers (e.g., of cobalt or iron) have not been effective because the molten silver dissolves them or diffuses through them during the brazing operation to react with the titanium. However, in accordance with my invention, the chromium layer does not act as a barrier between the silver and titanium. It does not prevent the contact of the molten silver with the titanium. Surprisingly, however, it does prevent the formation of the intermetallic compounds. During the brazing cycle the molten silver braze alloy contacts, mixes with, or diffuses into the chromium deposit and the titanium substrate to form a chemical alloy bond comprised of at least silver, titanium, and chromium.

In accordance with the preferred embodiment of my invention chromium is applied by depositing, plating or the like in a thin film or layer to the clean titanium or titanium alloy surfaces, which are to be brazed, by any suitable deposition, coating, or plating technique. Vapor deposition of the chromium, a technique well known in the art, is particularly suitable because an extremely thin film of relatively uniform thickness may be obtained. The deposit is preferably about 0.00005" to 0.001" in thickness. Subsequently the chromium-coated titanium components may be brazed by techniques which are now being used in the art. Both the vapor deposition step and the brazing step will be described in more detail below.

Figure 1:
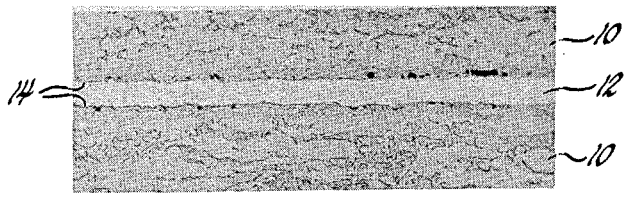

FIGURES 1–3 illustrate the effectiveness of my discovery and will also serve as a means for defining and characterizing the silver brazed titanium joint which comprises a part of my invention. In FIGURE 1 the photomicrograph (at 500×) shows the brazed joint between the titanium sections 10 comprised, by weight, of 6% aluminum, 4% vanadium and the balance substantially all titanium. The brazing alloy 12 was comprised of 95% silver and 5% aluminum by weight. Chromium vapor had been deposited on the titanium surfaces prior to brazing. The titanium surfaces were in contact with molten silver for about forty minutes during the brazing cycle. The photograph indicates the absence of brittle intermetallic compound from the interfacial area 14 between the silver alloy 12 and the titanium members 10.

Figure 2A:
Figure 2B:
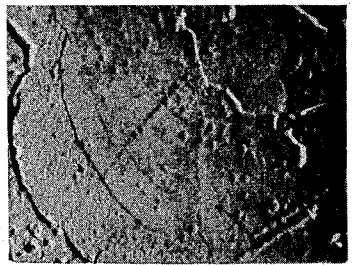

The two photomicrographs comprising FIGURE 2 also show the interface region 14 between the same titanium alloy and brazing alloy but at a higher magnification. Chromium was vapor deposited on the titanium prior to brazing. FIGURE 2a is at 2500× and FIGURE 2b is at 10,000×. No intermetallic compound is present in the interfacial area 14 which comprises the chemical or metallurgical bond between the silver braze and titanium members.

Figure 3A:
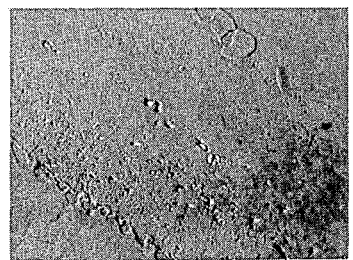
Figure 3B:
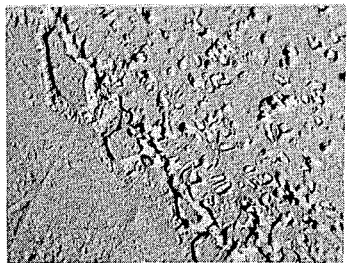

However, FIGURE 3 shows a brazed joint between the same titanium and brazing alloys in which no chromium coating was employed. The presence of the brittle intermetallic compound in the interface layer 14 is readily apparent. FIGURE 3a is at 2500× and FIGURE 3b is at 10,000×. FIGURES 2 and 3 were electron photomicrographs.

Figure 4:
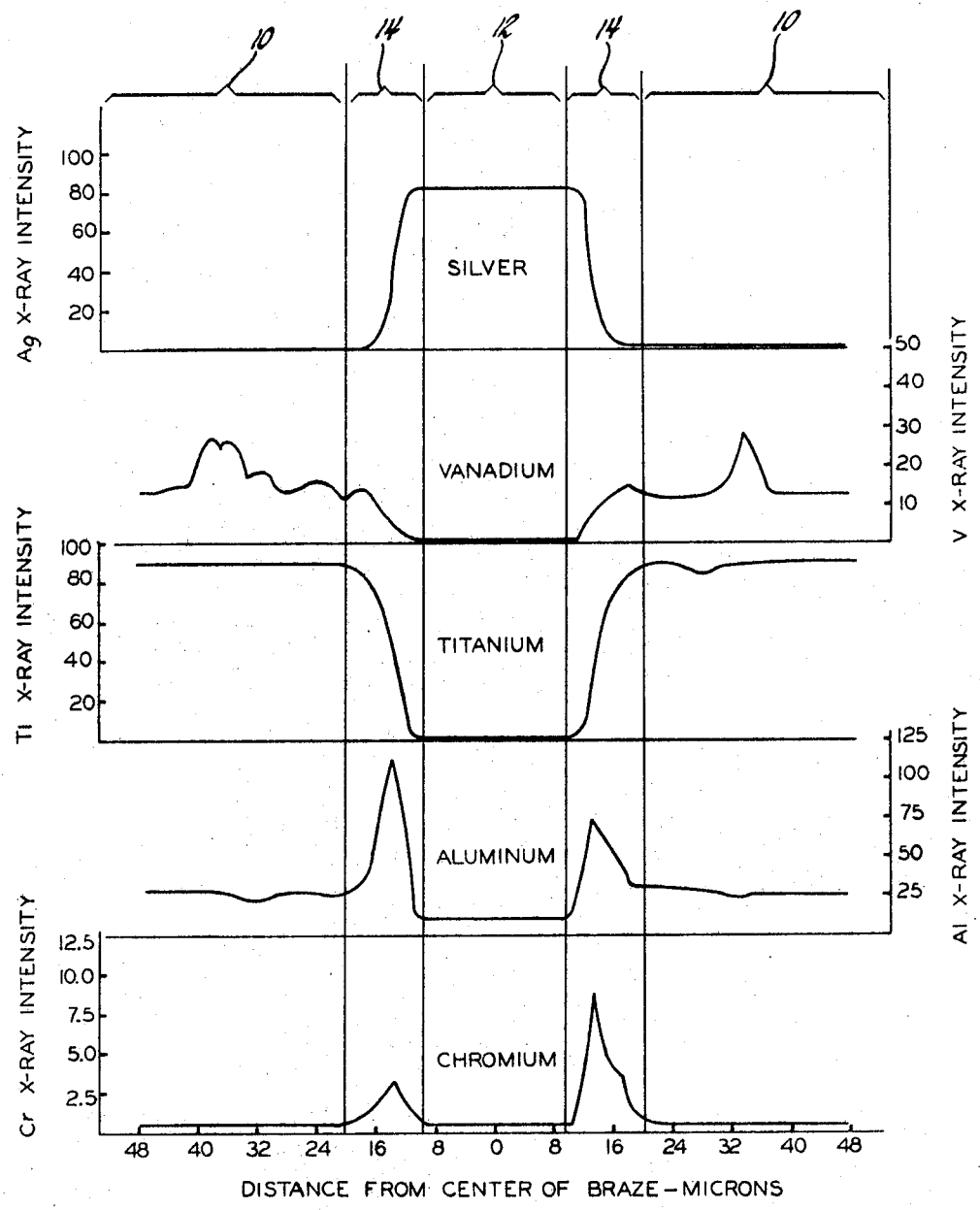
FIGURE 4 is a graph illustrating the distribution of elements across a titanium joint brazed with silver alloy, a chromium layer having been deposited on titanium components prior to brazing.

In the case of silver brazing titanium sections involving the specific titanium and silver alloys defined above, the reaction product creating the metallurgical bond is an alloy comprised of silver, vanadium, titanium, aluminum, and chromium in the relative amounts shown in FIGURE 4. FIGURE 4 represents an electron probe analysis of the interface portions 14 between the silver braze section 12 and the titanium sections 10. The results indicate that the bonding alloy interface 14 between the titanium and silver sections is about ten microns in thickness. I have found that it is possible to form a bond interface of mutually alloyed elements of up to at least about 0.002" in thickness. As would be expected, and as is shown in FIGURE 4, the composition of the interfacial alloy is not constant throughout its thickness, due to diffusion of the various elements. Silver attains a maximum concentration in the interfacial portion adjacent the silver brazing alloy and decreases to a minimum value in the interfacial portion adjacent the titanium bonding alloy member. Conversely the titanium concentration in the interfacial alloy area is a maximum value adjacent the titanium member and decreases in the direction of the silver brazing section. It is to be noted however that the chromium concentration attains its maximum value well within the interface layer and is of lower level at the titanium and silver surfaces. It is apparent that the presence of chromium does not prevent the alloying of the silver and titanium.

Figure 5:
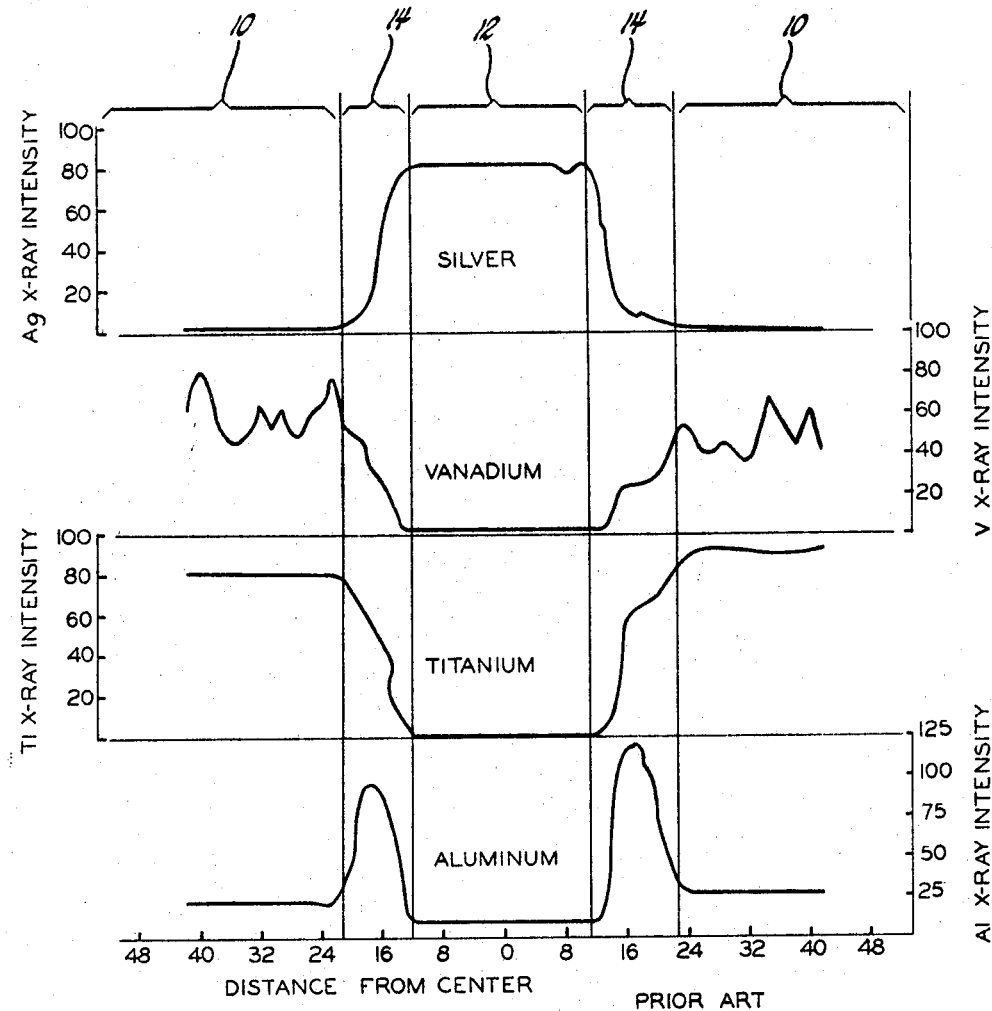
FIGURE 5 is a graph illustrating the distribution of elements across a titanium joint brazed with silver alloy in accordance with the prior art.
Figure 6:
FIGURE 6 is a flow diagram illustrating a preferred embodiment of the process.

FIGURE 5 is an electron probe analysis of a brazed joint of the same titanium alloy and silver brazing alloy except that no chromium has been applied to the titanium surfaces prior to the brazing. It is noted that an alloy interfacial layer is formed which is similar in silver and titanium concentrations to that shown in FIGURE 4.

Thus it is seen that the presence of chromium at the braze interface gives a heretofore unobtained and unexpected result during the brazing operation. While contact between the silver and titanium and other alloying constituents is not impeded, there is, nevertheless, no brittle intermetallic compound formed.

The effectiveness of the presence of chromium in the interfacial area between the silver braze and the titanium component is also manifested in the physical properties of the article.

Tests conducted with the above defined titanium and silver alloys show higher shear strength for the chromium treated titanium when the brazing cycle exceeds about five minutes at 1550 to 1650° F. In general the longer the period in which molten silver is in contact with the titanium the greater the difference in shear strength between the chromium containing joint and brazes accomplished in accordance with prior art techniques. As noted above a practical brazing cycle for many applications requires that the silver braze be in the molten state for about forty minutes or more.

In addition, fatigue tests have shown a major improvement in the fatigue endurance level of chromium treated long cycle brazes over untreated long cycle brazed joints. It is clear that with the practice of my invention full and practical braze cycles can be utilized in the forming of high strength large titanium structures.

While the techniques of applying chromium to a substrate by vapor deposition and of silver brazing titanium sections are in general known in the art, a specific example of a preferred embodiment will nevertheless more completely illustrate my invention. In general, it is preferable that the titanium details, or surfaces to be brazed, be clean prior to deposition of the chromium. When necessary titanium surfaces may be cleaned, for example, by wet vapor blasting all areas intended for brazing using a 325 grit silica flour lightly scrubbed in clean water. The surfaces may then be dried with forced air. Subsequently it may be advantageous to rinse the surfaces in acetone and redry using forced air.

Titanium sections to be brazed may then be placed in a chamber suitable for vacuum deposition of chromium. It is preferable in accordance with my invention that pure chromium chips (99.999% chromium) be used. Surface portions of the titanium section which are not to be brazed may be masked if desired to prevent deposition in these areas. The vaporizer source may be filled with sufficient chromium chips to provide a film on the titanium surface, preferably from about 0.00005" to 0.001" in thickness. These are approximate figures. The lower value is approximately the minimum thickness of chromium that I have been able to obtain by vapor deposition. The higher value is approximately the maximum amount of chromium which can readily be incorporated or alloyed at the silver braze-titanium substrate interface into the metallurgical bond during a normal brazing cycle. A thicker deposit of chromium, while preventing the formation of the intermetallic compound, may in some situations weaken the brazed joint. The preferred position of the titanium workpiece with respect to the chromium source will, of course, have to be determined for each particular vapor deposition apparatus and each specific workpiece configuration. In some cases multiple chromium sources and/or workpiece traversing may be required. The vapor deposition chamber preferably should be evacuated to an absolute pressure of approximately $5 \times 10^{-5}$ millimeters of mercury. The chromium vaporizer source is heated, as for example by electrical resistance heating elements, until sufficient chromium has evaporated and deposited on the workpiece. The chromium plated titanium sections may then be brazed.

The titanium sections are placed in a suitable brazing fixture so that they may be maintained in a proper position wherein intimate contact is maintained throughout the brazing cycle. As is known the strength of the brazed joint depends greatly on the clearance between the sections before brazing. It is common practice whenever possible to provide clearances of about 0.001″ to 0.008″. In general, clearances of 0.001″ to about 0.005″ are preferred. The molten silver brazing alloy will readily creep upwardly or horizontally on the surface of such a joint by capillary action or downwardly under the attraction of gravity. The fixtures and all accessories should be clean. Silver brazing alloy may be located between or adjacent the components to be joined and the fixture halves secured together to supply necessary pressure to obtain intimate contact at the areas of the braze. Then upon heating to temperatures above the melting point of the alloy molten braze material flows between the closely spaced titanium components. The brazing cycle preferably is performed in a suitable furnace adapted to maintain an inert atmosphere. The brazing of titanium components in argon atmosphere is preferred. In accordance with my invention the brazing temperature may be as high as 1550° F.–1650° F. or higher and molten silver brazing alloy may be allowed to remain in contact with the titanium components for periods as long as forty minutes or more as is required by the normal heating, brazing, and cooling cycles for massive sections.

As soon as cooling is started the molten silver brazing alloy solidifies, at least a portion thereof having now alloyed with the titanium and the chromium, to form a strong but ductile and fatigue-resistant bond which includes no brittle intermetallic compound. Subsequent to brazing, the fabricated titanium assembly may be annealed in accordance with prior techniques.

Although the electron microprobe analyses referred to above indicate relative amounts of the various constituents in the interface layer, it is difficult to precisely state the composition limits. However, it is known that in normal brazing cycles there is time only for a limited amount of diffusion of chromium away from the joint and that therefore a layer of chromium 0.00005″ to 0.001″ is sufficient to prevent the formation of the brittle intermetallic compound. Moreover, in the preferred embodiment when the maximum clearance between titanium sections is less than about 0.005″, the overall composition of the interfacial layer is thus practically limited by a material balance of the chromium and silver brazing alloy which have been used.

In the description of my invention, reference was made to a titanium-based alloy containing 6% aluminum and 4% vanadium by weight, and to a 95% silver, 5% aluminum by weight brazing alloy. It is to be understood, however, that my invention comprehends any brazing environment or composition in which molten silver can react with titanium to form a brittle intermetallic compound. Silver brazing alloys comprising, for example, by weight, 50% to 95% silver, 0 to 5% aluminum, 0 to 40% copper, 0 to 5% zinc, 0 to 1% nickel and 0 to 0.2% lithium, are commercially available. Any of these alloys contain sufficient silver to react with titanium during an extended brazing cycle. Similarly, titanium-based alloys other than that defined above are attacked by silver unless my invention is practiced.

It is also to be understood that means other than vapor deposition might be used to incorporate chromium into the brazed joint. For example, chromium might be alloyed with the silver braze material. Alternatively, small amounts of chromium might be plated, sprayed or otherwise incorporated onto or into the titanium surfaces, which are to be joined, by techniques other than vapor deposition. Workers skilled in the art would also recognize that laminated brazing materials are used, and in this case a laminated brazing material comprised of chromium and silver alloy might find application.

Thus while this invention has been described in terms of the specific embodiment, it will be recognized that other forms might readily be adopted by those skilled in the art; and therefore the scope of my invention is considered limited only by the following claims.

I claim:
1. A method of brazing titanium sections to one another comprising the steps of forming a sandwich comprising a pair of facing titanium surfaces, a silver brazing alloy portion therebetween and a chromium portion between each of said titanium surfaces and said silver brazing alloy portion all in abutting relationship, heating said sandwich at a temperature and for a time sufficient to diffuse said silver brazing alloy through said chromium layers and into said titanium surfaces, and cooling said sandwich.

2. In a process for joining titanium members by brazing, the improvement which consists in placing a silver brazing alloy between the titanium parts to be joined and diffusing the said brazing alloy through a chromium layer interposed between the said silver alloy and each of said titanium parts whereby a ductile alloy joint comprised of titanium, chromium, and silver is formed.

3. A method of joining titanium and titanium alloy sections in the fabrication of an article of manufacture, said method comprising the steps of applying a layer of chromium upon each of the facing surfaces of the titanium sections to be joined and subsequently brazing said titanium sections with silver brazing alloy whereby silver diffuses through said chromium layers and into said titanium surfaces thereby forming a strong ductile metallurgical bond comprised of chromium, silver, and titanium.

4. In the method of joining titanium and titanium alloy components comprised of brazing said components with silver brazing alloy at a temperature above about 1000° F., the improvement comprising applying a film of chromium to the surfaces to be joined prior to said brazing step whereby a metallurgical bond is formed between said silver brazing alloy and said titanium component said metallurgical bond being comprised of a ductile, fatigue-resistant alloy comprised of chromium, silver, and titanium.

5. A method of brazing titanium and titanium alloy sections comprising the steps of applying a thin deposit of chromium by vapor deposition to the titanium surfaces to be joined and subsequently brazing with silver brazing alloy, the thickness of said chromium deposit being between about 0.00005″ and 0.001″.

References Cited
UNITED STATES PATENTS 3,028,261  4/1962  Wachtell _____ 117—107.2

OTHER REFERENCES

Brazing Titanium to Titanium and to Mild and Stainless Steels, WADC Technical Report, 52–313, part 2, December 1953, pp. 44–50, Lewis, Faulkner, Rieppel and Voldrich, Battelle Memorial Institute.

JOHN F. CAMPBELL, Primary Examiner

J. L. CLINE, Assistant Examiner

U.S. Cl. X.R.

29—502, 504